United States Patent
Uchiyama et al.

(10) Patent No.: US 9,421,949 B2
(45) Date of Patent: Aug. 23, 2016

(54) WIPER FOR VEHICLE

(71) Applicant: ASMO CO., LTD., Shizuoka-ken (JP)

(72) Inventors: Keita Uchiyama, Hamamatsu (JP); Kei Hirata, Kosai (JP)

(73) Assignee: ASMO CO., LTD., Shizuoka-Ken (JP)

( * ) Notice: Subject to any disclaimer, the term of this patent is extended or adjusted under 35 U.S.C. 154(b) by 0 days.

(21) Appl. No.: 14/373,124

(22) PCT Filed: Oct. 23, 2013

(86) PCT No.: PCT/JP2013/078693
§ 371 (c)(1),
(2) Date: Jul. 18, 2014

(87) PCT Pub. No.: WO2014/065319
PCT Pub. Date: May 1, 2014

(65) Prior Publication Data
US 2015/0020339 A1    Jan. 22, 2015

(30) Foreign Application Priority Data

Oct. 24, 2012 (JP) .................................. 2012-234900

(51) Int. Cl.
*B60S 1/40* (2006.01)
*B60S 1/38* (2006.01)

(52) U.S. Cl.
CPC ............. *B60S 1/3856* (2013.01); *B60S 1/3867* (2013.01); *B60S 1/3863* (2013.01); *B60S 1/3881* (2013.01); *B60S 1/4064* (2013.01); *B60S 2001/409* (2013.01)

(58) Field of Classification Search
CPC .... B60S 1/3868; B60S 1/3867; B60S 1/4064; B60S 1/4087; B60S 2001/409; B60S 1/3497
USPC ............................ 15/250.32, 250.43, 250.201
See application file for complete search history.

(56) References Cited

U.S. PATENT DOCUMENTS 3,576,044 A * 4/1971 Besnard ................ B60S 1/4038
                                                                 15/250.32
4,445,249 A * 5/1984 Harbison .............. B60S 1/4038
                                                                 15/250.32
(Continued)

FOREIGN PATENT DOCUMENTS

CN          1989032 A     6/2007
JP     2000-272478 A    10/2000
(Continued)

OTHER PUBLICATIONS

International Preliminary Report on Patentability, International Application No. PCT/JP2013/078693, International filing date Oct. 23, 2013, issued Apr. 28, 2015 (4 pages).
(Continued)

*Primary Examiner* — Gary Graham
(74) *Attorney, Agent, or Firm* — Patterson Thuente Pedersen, P.A.

(57) ABSTRACT

A wiper for a vehicle is provided with: an arm-side connection section; a blade-side connection section; support shafts which protrude from side walls of the blade-side connection section; and shaft support recesses which are provided in the arm-side connection section. When a wiper blade is located in a mounting-dismounting enabled region, the mounting-dismounting openings and the small-diameter sections of the support shafts match with each other, and the support shafts and the shaft support recesses can be mounted to and dismounted from each other. When the wiper blade is located in a mounting-dismounting disabled region, the mounting-dismounting openings and the small-diameter sections do not match with each other, and the support shafts and the shaft support recesses cannot be mounted to and dismounted from each other. A shape retaining section is located between the pair of the shaft support recesses.

3 Claims, 7 Drawing Sheets

(56) References Cited

U.S. PATENT DOCUMENTS

| | | | |
|---|---|---|---|
| 6,594,854 B1 | 7/2003 | Matsumoto et al. | |
| 6,643,889 B1 * | 11/2003 | Kotlarski | B60S 1/3868 15/250.32 |
| 7,832,046 B2 | 11/2010 | Lee et al. | |
| 2006/0021177 A1 | 2/2006 | Marmoy et al. | |
| 2009/0165236 A1 | 7/2009 | Lee et al. | |
| 2011/0197386 A1 | 8/2011 | Jeon | |
| 2011/0247167 A1 * | 10/2011 | Huang | B60S 1/3881 15/250.32 |
| 2013/0239354 A1 * | 9/2013 | Lee | B60S 1/40 15/250.32 |

FOREIGN PATENT DOCUMENTS

| | | |
|---|---|---|
| JP | 2001080469 A | 3/2001 |
| JP | 3445530 B2 | 9/2003 |
| JP | 2005-524567 A | 8/2005 |
| JP | 2007-055589 A | 3/2007 |
| WO | WO 03/093079 A1 | 11/2003 |
| WO | 2008/029990 * | 3/2008 |
| WO | WO2012/089414 A1 * | 7/2012 |

OTHER PUBLICATIONS

Chinese Office Action for Application No. 201380007591.9, mailed Apr. 22, 2016, 6 pgs.

* cited by examiner

Distal Side ← → Basal Side

WIPER FOR VEHICLE

RELATED APPLICATIONS

The present application is a National Phase entry of PCT Application No. PCT/JP2013/078693, filed Oct. 23, 2013, which application claims priority to Japanese Application No. 2012-234900, filed Oct. 24, 2012, both of said applications being hereby incorporated by reference in their entirety.

FIELD OF THE INVENTION

The present invention relates to a vehicle wiper that wipes a windshield and a rear window of a vehicle.

BACKGROUND OF THE INVENTION

In a conventional vehicle wiper, a wiper blade is pivotally coupled to a distal end of a wiper arm so that the wiper blade can follow along a curved wiping surface. For example, in the vehicle wiper of patent document 1, a coupling hole, which extends through the distal end of the wiper arm, is pivotally coupled, through elastic engagement, to a support shaft formed on the wiper blade. In such a structure, the elastic engagement, which couples between the support shaft and the coupling hole facilitates the attachment and separation of the wiper arm and the wiper blade. However, the low coupling force between the support shaft and the coupling hole may result in unexpected separation of the coupled components.

To solve such a problem, patent document 2 describes a known example of a vehicle wiper. In the vehicle wiper of patent document 2, the support shaft of the wiper blade includes a small diameter portion located at a predetermined angular position. The small diameter portion has a smaller radial dimension than the diameter of the shaft. The arm side coupling hole includes an attachment-separation port (opening). The attachment-separation port has a dimension that is smaller than the diameter of the support shaft and larger than the small diameter portion. When the wiper blade is pivoted to a position corresponding to where the small diameter portion of the support shaft corresponds to the attachment-separation port of the coupling hole, the support shaft becomes attachable to and separable from the coupling hole. Attachment and separation of the support shaft from the coupling hole is disabled by pivoting the wiper blade about the support shaft from the attachable-separable position to a wiper usage position where the small diameter portion of the support shaft and the attachment-separation port of the coupling hole are not located in correspondence with each other. In such a structure, attachment and separation of the wiper blade is facilitated. Further, in the normal usage state, the wiper blade is rigidly coupled to and supported by the wiper arm to obviate unexpected separation of the wiper blade from the wiper arm.

SUMMARY OF THE INVENTION

In the vehicle wiper described in patent document 2, to reduce the size of wiper blade in the heightwise direction (direction perpendicular to the wiping surface), the portion coupling the wiper arm and the wiper blade may be reduced in height without changing the diameters of the support shaft and the coupling hole. This would reduce the thickness around the coupling hole at the distal end of the wiper arm. Thus, if the wiper arm were to be formed, in particular, from resin or the like, deformation may result in a tendency of easy opening of the attachment-separation port in the coupling hole, which is used for attachment and separation of the support shaft. The support shaft may thus fall out of the attachment-separation port of the coupling hole even if the wiper blade is located at the normal usage position. Hence, in the coupling structure of the support shaft described in patent document 2, it was difficult to reduce the size of the wiper blade in the heightwise direction.

Accordingly, it is an object of the present invention to provide a vehicle wiper capable of limiting opening of the attachment-separation port of the coupling hole while reducing the size in the heightwise direction.

To achieve the above object, one aspect of the present invention is a vehicle wiper including a wiper arm, an arm side coupling portion arranged on a distal end of the wiper arm, a wiper blade, a blade side coupling portion arranged on the wiper blade and pivotally coupled to the arm side coupling portion, and two side walls arranged on one of the arm side coupling portion and the blade side coupling portion. The two side walls face each other. Two support shafts respectively project from inner side surfaces of the two side walls. The two support shafts are coaxial with each other. Two shaft support recesses are arranged on the other one of the arm side coupling portion and the blade side coupling portion. The two support shafts are pivotally fitted to the two shaft support recesses, respectively. Each of the support shafts has a small diameter portion located at a predetermined angular position of the wiper arm relative to the wiper blade, and the small diameter portion has a smaller radial dimension than the diameter of the support shaft. Each of the shaft support recesses includes an attachment-separation port, and the attachment-separation port has a dimension that is smaller than the diameter of the support shaft and larger than the radial dimension of the small diameter portion. An attachable-separable region and a non-attachable-separable region are set as angular regions of the wiper blade relative to the wiper arm. When the wiper blade is in the attachable-separable region, the attachment-separation port and the small diameter portion of the support shaft are in correspondence with each other thereby enabling attachment and separation of the support shafts and the shaft support recesses. When the wiper blade is pivoted about the support shaft from the attachable-separable region to a wiper usage position and the wiper blade is in the non-attachable-separable region, the attachment-separation port and the small diameter portion are not in correspondence with each other thereby disabling attachment and separation of the support shafts and the shaft support recesses. The arm side coupling portion or the blade side coupling portion that includes the shaft support recesses includes a shape sustaining portion that sustains the shape of the attachment-separation port, and the shape sustaining portion is located between the two shaft support recesses.

In this structure, the support shafts and a coupling hole that pivotally couple the wiper blade and the wiper arm are divided in the axial direction. Thus, the coupling hole that supports the support shaft does not need to be a through hole. Further, the shape sustaining portion located between the divided coupling holes (two shaft support recesses) sustains the shape of the attachment-separation port. Thus, even if the coupling portion of the wiper arm and the wiper blade is reduced in size in the heightwise direction (direction perpendicular to the wiping surface), the attachment-separation port of the shaft support recess does not easily open. Thus, when the wiper blade is at the usage position (i.e., when the pivot position of the wiper blade relative to the wiper arm is in the non-attachable-separable region), the support shafts are rigidly coupled to the shaft support recesses. Further, when attachment and separation is necessary such as for maintenance, the support shafts and the shaft support recesses may be easily attached to and separated from one another by simply pivoting the wiper blade to the attachable-separable region.

Preferably, in the vehicle wiper, the wiper blade and the wiper arm respectively include a blade side engagement portion and an arm side engagement portion that are elastically engaged with each other to limit pivoting of the wiper blade in the non-attachable-separable region.

In such a structure, elastic engagement of the blade side engagement portion and the arm side engagement portion limits free pivoting of the wiper blade in the non-attachable-separable. This obviates the wiper blade hitting the vehicle body, the wiping surface, or the like when the wiper arm 11 that would be caused by unexpected pivoting of the wiper blade when the wiper arm is locked back (held upright with respect to the wiping surface) during maintenance or the like. Further, unexpected separation of the wiper blade and the wiper arm may be prevented when the wiper blade is in the attachable-separable region.

Preferably, in the vehicle wiper the blade side engagement portion and the arm side engagement portion are arranged toward a basal side of the wiper arm from the support shafts and the shaft support recesses.

In such a structure, the arm side engagement portion is easily formed in the main body of the wiper arm. This simplifies the structures of the blade side engagement portion and the arm side engagement portion.

Preferably, in the vehicle wiper, the wiper blade includes a blade rubber that wipes a wiping surface, and a rubber holding portion that holds the blade rubber. The rubber holding portion and the blade side coupling portion are integrally formed to configure a holder member.

In such a structure, the holder member of the wiper blade is coupled to the distal end of the wiper arm (arm side coupling portion) and holds the blade rubber that wipes the wiping surface. That is, the coupling of the blade rubber to the arm side is completed with the same holder member. Thus, the wiper blade may easily be reduced in size in the heightwise direction compared to a structure that holds the blade rubber with a lever assembly including levers coupled in the form of a whippletree.

Preferably, in the vehicle wiper, the wiper arm includes an upper wall and side walls, which extend toward the wiping surface from two widthwise ends of the upper wall. The widthwise ends are ends of the upper wall arranged in a widthwise direction of the wiper. The upper wall includes a load receiving unit capable of contacting the blade side coupling portion in the widthwise direction of the wiper.

In such a structure, when load in the wiper widthwise direction is applied to the wiper blade (e.g., when the wiper is driven with the blade rubber frozen onto the wiping surface, load is received by the load receiving unit through the blade side coupling portion. This limits separation of the support shafts from the shaft support recesses that would occur when the distance is increased in the widthwise direction between the side walls of the wiper arm due to load. As a result, separation of the wiper blade may be limited.

The present invention provides a vehicle wiper capable of limiting opening of the attachment-separation port of the coupling hole while reducing the size in the heightwise direction.

DETAILED DESCRIPTION

One embodiment of a vehicle wiper will now be described.

Figure 1:
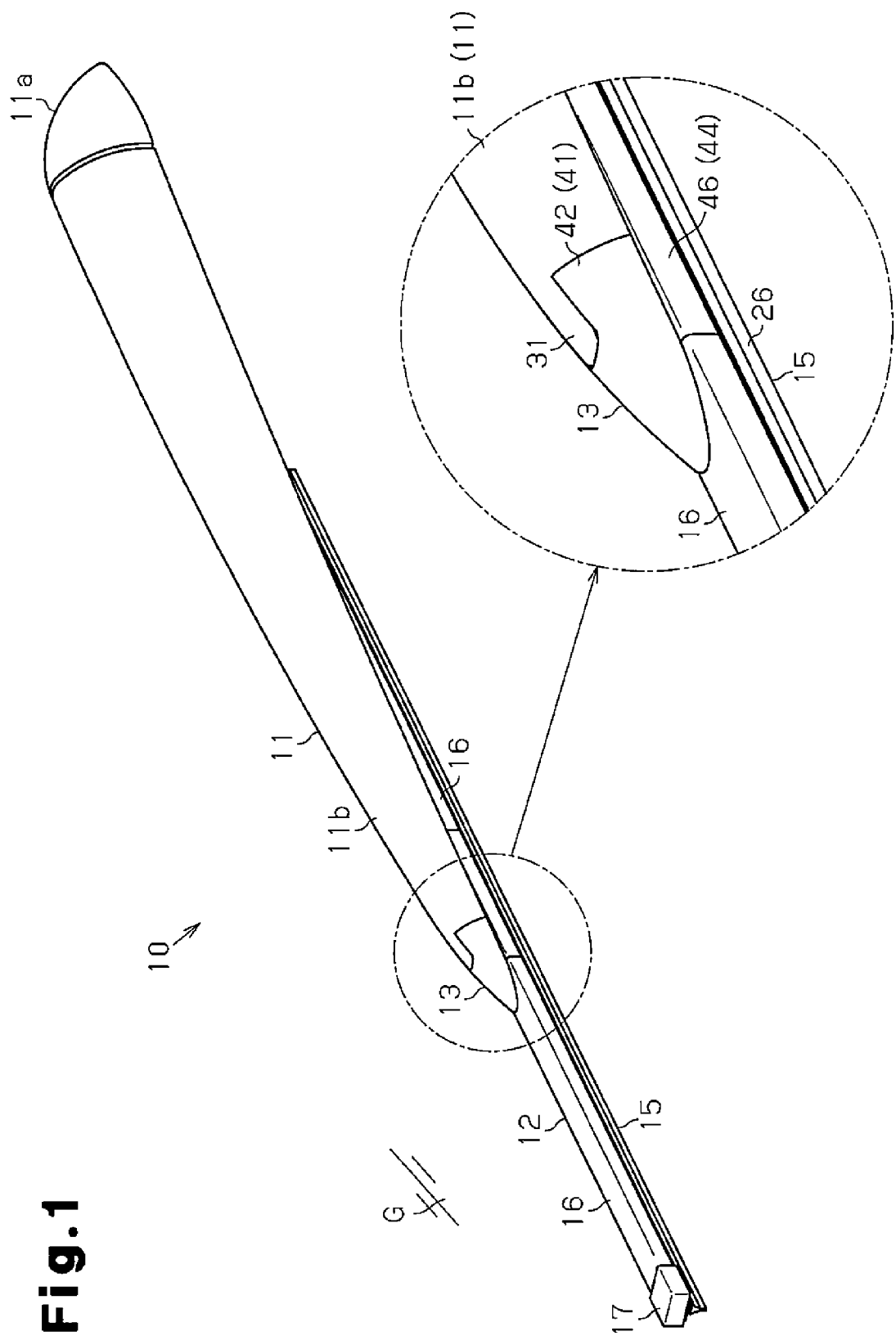
FIG. 1 is a perspective view showing one embodiment of a vehicle wiper.

As shown in FIG. 1, a vehicle wiper 10 according to the present embodiment wipes raindrops or the like from the surface (wiping surface G) of a rear window of a vehicle. The vehicle wiper 10 includes a wiper arm 11, which is formed from resin, and a wiper blade 12, which is pivotally coupled to the distal end of the wiper arm 11 and arranged in contact with the wiping surface G.

The wiper arm 11 includes a basal end coupled to an arm head 11a, which is fixed to a pivot shaft (not shown). A wiper motor (not shown) drives and pivots the pivot shaft to swing back and forth the wiper arm 11 and the wiper blade 12. The swinging wiper blade 12 wipes the wiping surface G. A spring (not shown), which generates a pushing force pushing the wiper blade 12 against the wiping surface G, is attached to the wiper arm 11.

The wiper blade 12 includes a resin holder member 13, which is coupled to the wiper arm 11, a backing 14 and a blade rubber 15, which are held by the holder member 13, and two cases 16, which are attached to the backing 14 and the blade rubber 15. A cap 17, which prevents the cases 16 and the blade rubber 15 from falling out of the wiper blade 12, is attached to each of the two longitudinal ends of the wiper blade 12.

Figure 2:
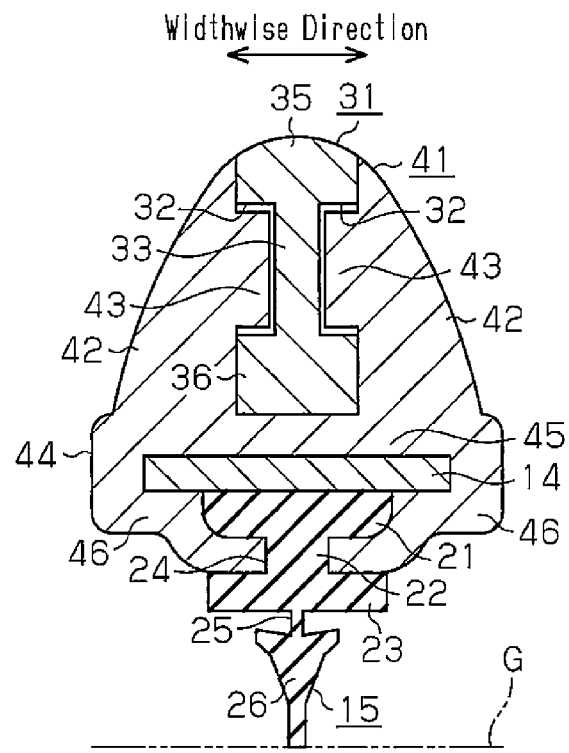
FIG. 2 is a cross-sectional view of the vehicle wiper shown in FIG. 1.

As shown in FIG. 2, the blade rubber 15 is elongated and formed from an elastic rubber material or an elastomer. The blade rubber 15 is formed to be symmetric to a center line in the widthwise direction (lateral direction in FIG. 2) and have a uniform cross-sectional shape in the longitudinal direction. The blade rubber 15 includes an upper portion defining a head portion 21, which is held by the case 16, and extending over the entire longitudinal direction of the blade rubber 15.

The head portion 21 is flat and thin in the heightwise direction (direction perpendicular to the wiping surface G). A coupling portion 22 extends downward from the middle of the head portion 21 in the widthwise direction. A portion below the head portion 21 defines an extending portion 23, which is thinner than the head portion 21 in the heightwise direction and coupled to the head portion 21 by the coupling portion 22. The extending portion 23 extends from the lower end of the coupling portion 22 to two sides in the widthwise direction of the blade rubber 15. The coupling portion 22, which is thinner in the widthwise direction than the head portion 21 and the extending portion 23, form a constricted portion 24 (holding groove), which is depressed toward the inner side from two widthwise side surfaces.

A neck portion 25 extends from the lower surface of the extending portion 23. A portion below the blade rubber 15 defines a wiping portion 26 connected to the extending portion 23 by the neck portion 25. The neck portion 25 is defined at the middle of the blade rubber 15 in the widthwise direction and formed to be narrower than the coupling portion 22. The wiping portion 26 is tapered to narrow from the upper part (end at the side of the neck portion 25) toward the lower part and has substantially the same width as the neck portion 25 at the lower end. Deformation of the neck portion 25 allows the wiping portion 26 to tilt in the widthwise direction relative to the head portion 21. The extending portion 23 is entirely wider than the head portion 21 to contact the shoulder of the wiping portion 26 when the wiping portion 26 is tilted. The contact restricts the tilt position of the wiping portion 26.

The backing 14, which is formed from a metal plate spring material, is arranged above the head portion 21 of the blade rubber 15 (non-wiping surface side). The backing 14 is elongated in the longitudinal direction of the blade rubber 15 and set to have the same length as the blade rubber 15. The backing 14 is arranged such that its plate surface extends in a direction orthogonal to the heightwise direction of the blade rubber 15. The backing 14 contacts the upper surface of the head portion 21 (end surface at the non-wiping surface side) in the heightwise direction of the blade rubber 15. The backing 14 is set to be wider than the head portion 21. The two widthwise ends of the backing 14 each project toward the outer side in the widthwise direction from the head portion 21.

The coupling of the holder member 13, which is arranged at the middle of the wiper arm 11 in the longitudinal direction, with the wiper arm 11 will now be described.

As shown in FIGS. 1 and 2, the distal end of the wiper arm 11 defines an arm side coupling portion 31 and the holder member 13 includes a blade side coupling portion 41. The coupling portions 31 and 41 are pivotally coupled to each other.

The arm side coupling portion 31 is formed to be narrower than a main body 11b of the wiper arm 11 (see FIG. 1). A shaft support recess 32 depressed toward the inner side in the widthwise direction is formed in each of the two widthwise side surfaces of the arm side coupling portion 31. A shape sustaining wall 33 is formed between the shaft support recesses 32. The arm side coupling portion 31 is symmetric in shape in the widthwise direction with the shape sustaining wall 33 located in the center. The shaft support recesses 32 at the widthwise sides of the shape sustaining wall 33 are identical in shape and are concentric with each other.

Figure 3:
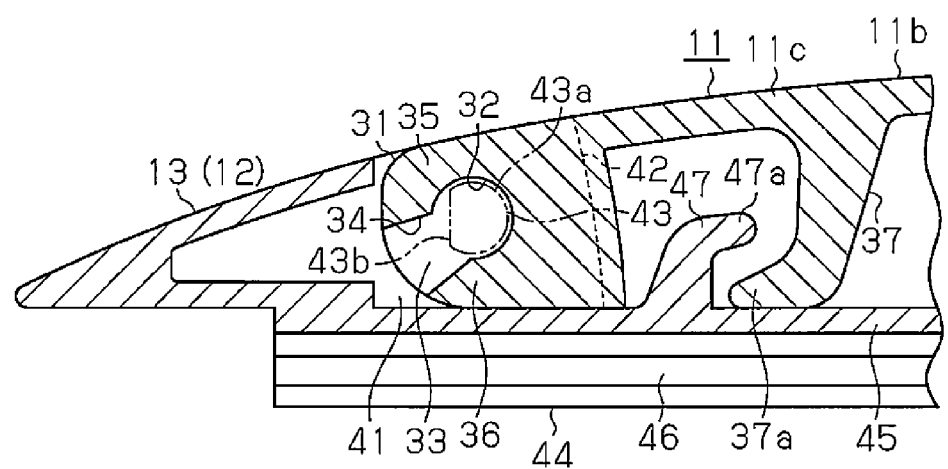
FIG. 3 is a cross-sectional view of the wiper shown in FIG. 1 illustrating a wiper arm and a holder member at a wiper usage position.

As shown in FIG. 3, the shaft support recesses 32, which are formed to be arcuate, are coaxial and have the same diameter. The blade side coupling portion 41 includes a support shaft 43, which will be described later and is pivotally supported by the shaft support recesses 32. The axis of each shaft support recess 32 is set to be parallel with the widthwise direction of the wiper blade 12. A portion peripheral to each shaft support recess defines an attachment-separation port 34 used to attach and separate the support shaft 43 to and from the shaft support recess 32. Each shaft support recess 32 opens toward the distal side in the longitudinal direction of the wiper blade 12 (side distant from the basal end of the wiper arm 11) through the attachment-separation port 34. The attachment-separation port 34 is formed so that the opening widens toward the distal end of the arm side coupling portion 31.

A shape sustaining wall 33 is formed between the two shaft support recesses 32 and the attachment-separation port 34 in the widthwise direction to integrally connect an upper wall 35 and a lower wall 36 forming each of the shaft support recesses 32 and the attachment-separation port 34 in the heightwise direction of the wiper blade 12 (direction perpendicular to the wiping surface G). The shape sustaining wall 33 prevents the upper wall 35 and the lower wall 36 from moving away from each other. That is, the shape sustaining wall 33 functions to couple the upper wall 35 and the lower wall 36 to each other and hold the shape of the attachment-separation port 34 in the shaft support recesses 32 so that the attachment-separation port 34 does not open.

As shown in FIGS. 2 and 3, the blade side coupling portion 41 includes two side walls 42, which face each other in the widthwise direction (pivot shaft direction), and two support shafts 43, which project from the inner surfaces of the side walls 42 and are coaxial with each other. The side walls 42 are arranged at the two widthwise sides of the arm side coupling portion 31 and are formed so that the outer surfaces of the side walls 42 are flush with the widthwise side surfaces of the main body 11b of the wiper arm 11 (see FIG. 1). The space between the side walls 42 opens toward the upper side (non-wiping surface side) to allow the arm side coupling portion 31 to be coupled.

The two support shafts 43, which are formed integrally with the side walls 42, are identical in shape. Each support shaft 43 includes an arcuate portion 43a, which has a diameter corresponding to the inner diameter of the shaft support recess 32, and a (D-shaped) small diameter portion 43b, which has a smaller diameter than the arcuate portion 43a. The arcuate portion 43a is defined by the circumferential surface of the support shaft 43 extending over one half or greater of the circumference. The remaining circumferential surface forms the small diameter portion 43b. The attachment-separation port 34 of the shaft support recess 32 is smaller in diameter than the support shaft 43 (diameter of the arcuate portion 43a) and larger in the radial direction than the small diameter portion 43b.

Figure 5:
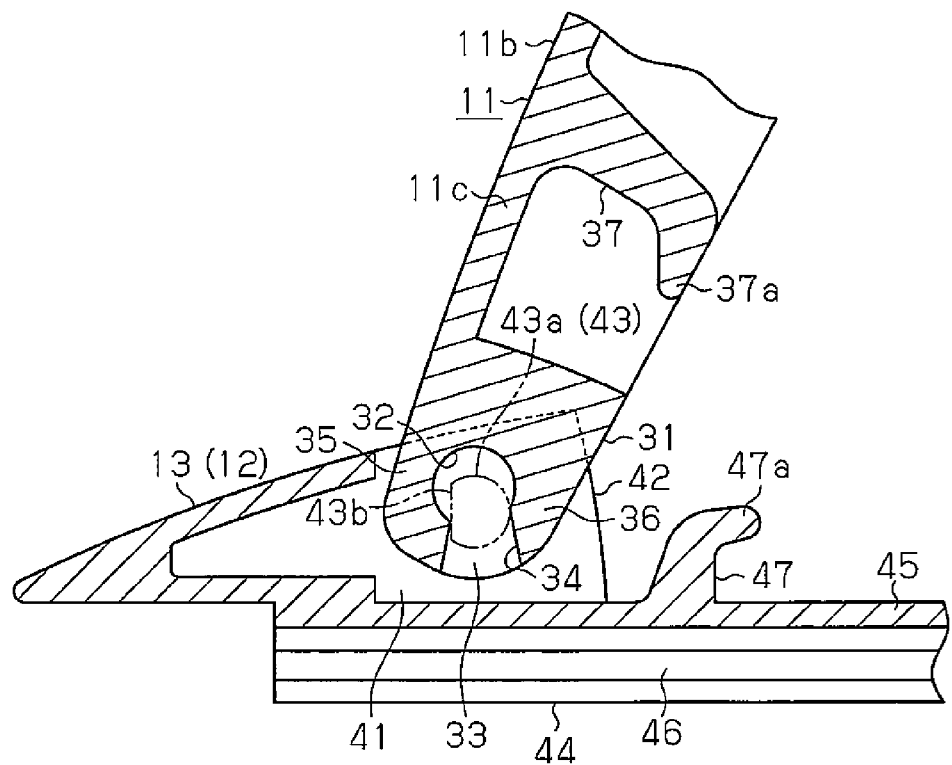
FIG. 5 is a cross-sectional view of the wiper shown in FIG. 1 illustrating attachment and separation of the wiper arm and the holder member.

This allows the support shafts 43 and the shaft support recesses 32 to be attached to and separated from one another by relatively pivoting the wiper blade 12 and the wiper arm 11 to a position where the small diameter portion 43b of the support shaft 43 corresponds to the attachment-separation port 34 (see FIG. 5). The attachment and separation of the support shafts 43 and the shaft support recesses 32 are disabled by relatively pivoting the wiper blade 12 about the support shaft 43 from a attachable-separable region, where the attachment-separation port 34 corresponds to the small diameter portion 43b of the support shaft 43, to the wiper usage position shown in FIG. 3 so that the wiper blade 12 is located in a non-attachable-separable region where the attachment-separation port 34 does not correspond to the small diameter portion 43b. When the wiper blade 12 is located in the non-attachable-separable region, the arcuate portion 43a contacts the wall surface of the shaft support recess 32.

As shown in FIGS. 2 and 3, the blade side coupling portion 41 includes a rubber holding portion 44 extending toward the lower side (side of wiping surface G) of the blade side coupling portion 41. The rubber holding portion 44 is substantially tubular and extends in the longitudinal direction of the blade rubber 15 and hold the head portion 21 of the blade rubber 15 and the longitudinal central part of the backing 14.

In detail, the rubber holding portion 44 includes an upper cover 45, which covers the upper surface (surface on the anti-blade rubber side) of the backing 14, and a holding piece 46, which extends from each of the two widthwise ends of the upper cover 45 to that hold the backing 14 and the head portion 21. The distal end of each holding piece 46 is fitted to the corresponding constricted portion 24 below the head portion 21. In other words, the coupling portion 22 of the blade rubber 15 is fitted to a groove between the distal ends of the holding pieces 46. Thus, the head portion 21 is engaged with the distal end of each holding piece 46 in the heightwise direction of the blade rubber 15. The backing 14 is accommodated in an accommodation space formed between the upper cover 45, the holding pieces 46, and the head portion 21.

Thus, the rubber holding portion 44 surrounds and holds the backing 14 and the head portion 21 with the backing 14 in contact with the upper surface of the head portion 21. The extending portion 23, the neck portion 25, and the wiping portion 26 of the blade rubber 15 are exposed from the lower side (wiping surface G side) of the rubber holding portion 44. A stopper (not shown) is engaged with the longitudinally central portion of the backing 14 to restrict movement of the backing 14 in the longitudinal direction.

The side walls 42 of the blade side coupling portion 41 are formed to extend to the upper side (non-wiping surface side) from the upper cover 45 of the rubber holding portion 44. In a direction orthogonal to the longitudinal direction, the blade side coupling portion 41 has a substantially U-shaped cross-section formed by the side walls 42, the upper cover 45, and an open upper side.

As shown in FIG. 3, the rubber holding portion 44 includes a blade side engagement portion 47 extending toward the upper side (non-wiping surface side) from the upper cover 45. The blade side engagement portion 47 is located at the blade basal side (basal side in the longitudinal direction of the wiper blade 12) of the side walls 42 of the rubber holding portion 44. The "blade basal side" refers to locations of the wiper blade 12 proximal to the pivot shaft at the basal end of the wiper arm 11. An elastic piece 47a projects toward the basal side of the blade from the distal end of the blade side engagement portion 47.

The main body 11b of the wiper arm 11 has a reverse-U-shaped cross-section that opens toward the side of the wiping surface G. An arm side engagement portion 37 extending toward the lower side (side of wiping surface G) is formed in the upper wall 11c of the main body 11b. An elastic piece 37a projects toward the distal side of the blade (side opposite to the basal end of the blade) is formed at the distal end of the blade side engagement portion 47. The elastic piece 37a may be elastically engaged with the elastic piece 47a of the blade side engagement portion 47.

Referring to FIG. 1, the two cases 16 are formed from a soft (flexible) resin material. The two cases 16 are elongated in the longitudinal direction of the blade rubber 15 and are respectively arranged at the two longitudinal sides in the direction of the holder member 13. Each case 16, which has a structure similar to the rubber holding portion 44 of the holder member 13, surrounds and holds the backing 14 and the head portion 21 with the backing 14 in contact with the upper surface of the head portion 21. Hence, the longitudinally central part of the backing 14 and the head portion 21 of the blade rubber 15 is held by the rubber holding portion 44 of the holder member 13. The two longitudinal sides of the backing 14 and the head portion 21 are held by the cases 16. The cases 16 are formed to be in communication with each other through the rubber holding portion 44 of the holder member 13.

The operation of the present embodiment will now be described.

Figure 4:
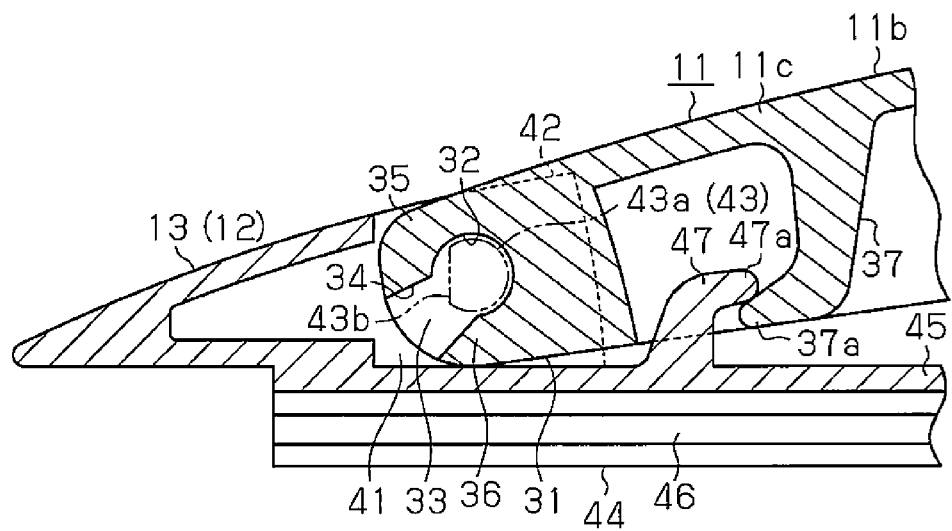
FIG. 4 is a cross-sectional view of the wiper shown in FIG. 1 illustrating the wiper arm and the holder member when an arm side coupling portion and a blade side coupling portion are in engagement.

As shown FIG. 3, at the wiper usage position where the wiper arm 11 is substantially parallel to the wiper blade 12, the small diameter portion 43b of the support shaft 43 and the attachment-separation port 34 of the shaft support recess 32 are not in correspondence with each other. This disables attachment and separation of the support shaft 43 and the shaft support recess 32. In such a state, the elastic piece 37a of the arm side engagement portion 37 is located toward the side of the wiping surface G (lower side in FIG. 3) from the elastic piece 47a of the blade side engagement portion 47. The wiper arm 11 and the wiper blade 12 are relatively pivotal about the support shaft 43 in a direction in which the elastic pieces 37a and 47a move toward each other. The pivoting of the wiper blade 12 in the non-attachable-separable region is enabled in a range in which the elastic pieces 37a and 47a do not come into contact. More specifically, as shown in FIG. 4, engagement of the arm side engagement portion 37 and the blade side engagement portion 47 limits the pivoting of the wiper blade 12 in the non-attachable-separable region. This obviates the wiper blade 12 hitting the vehicle body, the wiping surface G, or the like when the wiper arm 11 that would be caused by unexpected pivoting of the wiper blade 12 when the wiper arm 11 is locked back (held upright with respect to the wiping surface G) during maintenance or the like. Further, unexpected separation of the wiper blade 12 and the wiper arm 11 may be prevented when the wiper blade 12 is in the attachable-separable region.

When the wiper blade 12 is relatively pivoted about the support shaft 43 from the position shown in FIG. 4 by excessive force in a direction (counterclockwise direction in FIG. 4) in which the main body 11b moves away from the rubber holding portion 44, the arm side engagement portion 37 and the blade side engagement portion 47 are elastically deformed. Thus, the arm side engagement portion 37 moves over the blade side engagement portion 47 and is disengaged from the blade side engagement portion 47. This cancels the pivoting limitation of the wiper arm 11 and the wiper blade 12 thereby allowing the wiper blade 12 to be relatively pivoted to the attachable-separable region where the attachment-separation port 34 corresponds to the small diameter portion 43b of the support shaft 43.

As shown in FIG. 5, in the attachable-separable region, the attachment-separation port 34 corresponds to the small diameter portion 43b of the support shaft 43. This allows for attachment and separation of the support shaft 43 and the shaft support recess 32. Thus, when the wiper blade 12 needs to be separated and attached such as during maintenance, the support shaft 43 and the shaft support recess 32 may be easily separated and attached by simply disengaging the arm side engagement portion 37 and the blade side engagement portion 47 and pivoting the wiper blade 12 to the attachable-separable region.

Thus, the pivotal coupling of the support shaft 43, which is D-shaped, and the shaft support recess 32, allows for the coupling of the support shaft 43 and the shaft support recess 32 when the wiper blade 12 is in the usage position. When attachment and separation need to be performed for such as during maintenance, the support shaft 43 and the shaft support recess 32 may be easily attached and separated just by pivoting the wiper blade 12 to the attachable-separable region.

The arm side coupling portion 31 of the present embodiment includes the two shaft support recess 32, to which the two support shafts 43 of the blade side coupling portion 41 are pivotally fitted, and the shape sustaining wall 33 between the shaft support recesses 32. That is, the support shaft 43 and the coupling hole that pivotally couple the wiper blade 12 and the wiper arm 11 are divided in the axial direction. Thus, there is no need for the coupling hole that supports the support shaft 43 to be a through hole. The shape sustaining wall 33, which is located between the divided coupling hole (two shaft support recesses 32), integrally connects the upper wall 35 and the lower wall 36 to form the attachment-separation port 34 and sustains the shape of the attachment-separation port 34 is held. Thus, even if each of the coupling portions 31 and 41 is reduced in size in the heightwise direction (direction perpendicular to the wiping surface G), the attachment-separation port 34 of the shaft support recess 32 does not easily open. This further rigidly couples the support shaft 43 and the shaft support recess 32 when the wiper blade 12 is at the usage position.

The characteristic effects (advantages) of the present embodiment will now be described.

(1) The blade side coupling portion 41 includes the two side walls 42, which face each other in the wiper widthwise direction (direction of pivot axis), and two support shafts 43, which project from the inner surfaces of the side walls 42 and are coaxial with each other. The arm side coupling portion 31 includes the two shaft support recesses 32, to which the two support shafts 43 are pivotally fitted. The arm side coupling portion 31 includes the shape sustaining wall 33 (shape sustaining portion) located between the two shaft support recesses 32 to sustain the shape of the attachment-separation port 34. In such a structure, the support shafts 43 and the coupling hole that pivotally couple the wiper blade 12 and the wiper arm 11 are divided in the axial direction. Thus, the coupling hole that supports the support shaft 43 does not need to be a through hole. The shape of the attachment-separation port 34 is sustained by the shape sustaining wall 33 located between the divided coupling holes (two shaft support recesses 32). Thus, even if the coupling portion of the wiper arm 11 and the wiper blade 12 is reduced in size in the heightwise direction (direction perpendicular to the wiping surface G), the attachment-separation port 34 of the shaft support recess 32 does not easily open.

Each support shaft 43 includes the small diameter portion 43b located at a predetermined angular position of the wiper arm 11 relative to the wiper blade 12. The small diameter portion 43b has a smaller radial dimension than the diameter of the support shaft 43. Each of the shaft support recesses 32 includes the attachment-separation port 34, which has a smaller dimension than the diameter of the support shaft 43 and a larger dimension than the radial dimension of the small diameter portion 43b. The attachable-separable region and the non-attachable-separable region are set as at angular regions of the wiper blade 12 relative to the wiper arm 11. When the wiper blade 12 is in the attachable-separable region, the attachment-separation port 34 and the small diameter portion 43b of the support shaft 43 are in correspondence, and the support shaft 43 and the shaft support recess 32 are attachable and separable to and from each other. When the wiper blade 12 is pivoted about the support shaft 43 from the attachable-separable region to the wiper usage position and the wiper blade 12 is in the non-attachable-separable region, the attachment-separation port 34 and the small diameter portion 43b are not in correspondence and the support shaft 43 and the shaft support recess 32 are not attachable and separable to and from each other.

(2) The wiper blade 12 and the wiper arm 11 respectively include the blade side engagement portion 47 and the arm side engagement portion 37 that limit pivoting of the wiper blade 12 in the non-attachable-separable region through elastic engagement with each other. In such a structure, free pivoting of the wiper blade 12 in the non-attachable-separable region is limited by the elastic engagement of the blade side engagement portion 47 and the arm side engagement portion 37. Thus, when the wiper arm 11 is locked back (held upright with respect to the wiping surface G), the wiper blade 12 is prevented from hitting the wiping surface G and the like that would be caused by unexpected pivoting. In addition, when the wiper blade 12 reaches the attachable-separable region, unexpected separation of the coupled wiper blade 12 and wiper arm 11 is obviated.

(3) The blade side engagement portion 47 and the arm side engagement portion 37 are arranged toward the basal side of the wiper arm 11 from the support shaft 43 and the shaft support recess 32. In such a structure, the arm side engagement portion 37 is formed with further ease in the main body 11b of the wiper arm 11. This simplifies the structures of the blade side engagement portion 47 and the arm side engagement portion 37 are compared to when the engagement portion is arranged in each of the support shaft 43 and the shaft support recess 32. Further, the engagement portion is spaced apart from the pivot axis of the wiper blade 12 and the wiper arm 11 (axis of the support shaft 43 and the shaft support recess 32). This limits free pivoting of the wiper blade 12 relative to the wiper arm 11 that would be caused by a small force.

(4) The wiper blade 12 includes the blade rubber 15, which wipes the wiping surface G, and the rubber holding portion 44, which holds the blade rubber 15. The rubber holding portion 44 and the blade side coupling portion 41 are formed integrally to form the holder member 13. Thus, the coupling of the blade rubber 15 to the arm side is achieved with the same holder member 13. This allows the wiper blade 12 to be easily reduced in size in the heightwise direction compared to the conventional structure that holds the blade rubber 15 with a lever assembly in which levers are coupled in the form of a whippletree.

(5) The arm side coupling portion 31 is symmetric in shape in the widthwise direction with the shape sustaining wall 33 located in the center. That is, the shape sustaining wall 33 is arranged at the middle of the arm side coupling portion 31 in the widthwise direction. The shaft support recesses 32 (support shafts 43) thus have the same axial length, and the length of each support shaft 43 is easily obtained. This limits separation of the support shafts 43 in the axial direction from the shaft support recesses 32.

(6) The shape sustaining wall 33 is formed to extend to the distal end of the arm side coupling portion 31. This further increases the strength of the shape sustaining wall 33. As a result, the rigidity is further increased to limit opening of the attachment-separation port 34.

The embodiment described above may be modified in the following manner.

In the embodiment described above, the arm side coupling portion 31 includes the shaft support recesses 32, and the blade side coupling portion 41 includes the support shafts 43. Instead, the arm side coupling portion 31 may include the support shafts, and the blade side coupling portion 41 may include the shaft support recesses.

Figure 6:
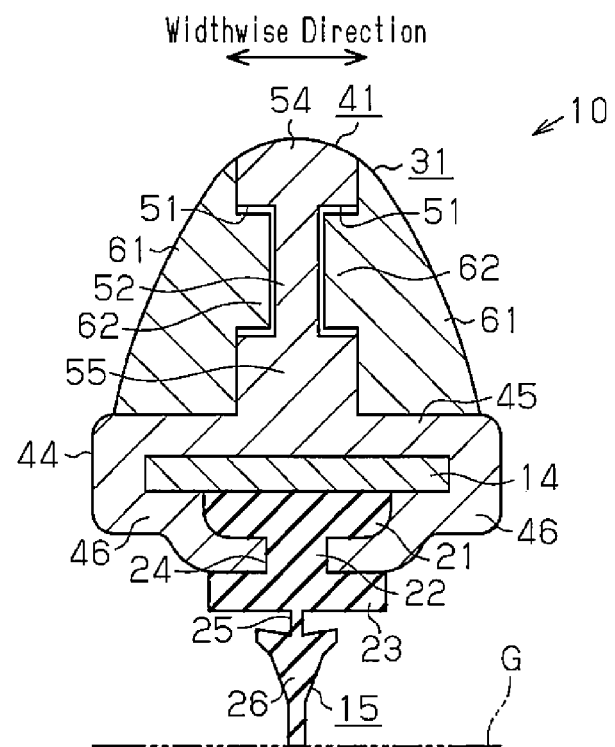
FIG. 6 is a cross-sectional view of a further example of a vehicle wiper.
Figure 7:
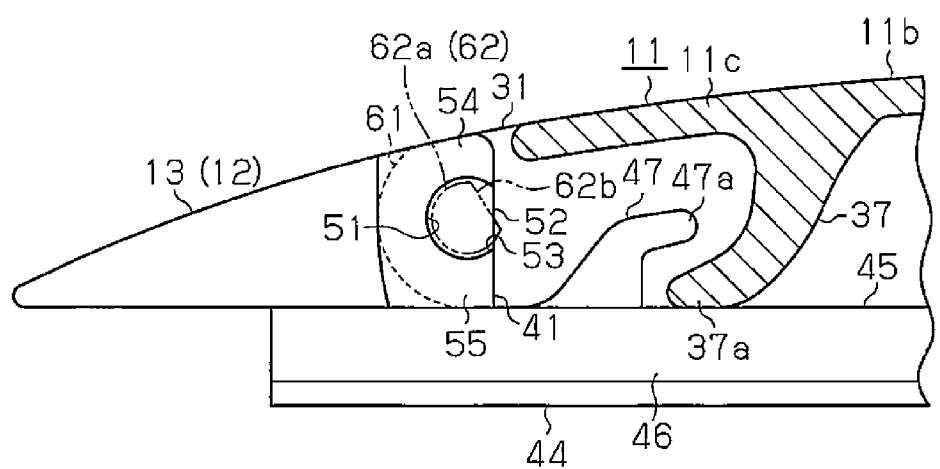
FIG. 7 is a cross-sectional view of the wiper shown in FIG. 6 illustrating a wiper arm and a holder member at a wiper usage position.

For example, in the structure shown in FIGS. 6 and 7, the blade side coupling portion 41 is thinner than the rubber holding portion 44 in the widthwise direction and projects toward the upper side (non-wiping surface side) from the upper cover 45 of the rubber holding portion 44. Shaft support recesses 51 depressed toward the inner side in the widthwise direction are formed in the two widthwise side surfaces of the blade side coupling portion 41. A shape sustaining wall 52 is formed between the shaft support recesses 51. The blade side coupling portion 41 is symmetric in shape in the widthwise direction with the shape sustaining wall 52 located in the center. The shaft support recesses 51 in the two widthwise sides of the shape sustaining wall 52 are identical in shape.

As shown in FIG. 7, the shaft support recesses 51, which are formed to be arcuate, are coaxial and have the same diameter. The shaft support recesses 51 pivotally support the support shaft 62 of the blade side coupling portion 41. The axis of each shaft support recess 51 is set to be parallel to the widthwise direction of the wiper blade 12. A portion peripheral to each shaft support recess 51 defines an attachment-separation port 53, which opens toward the blade basal side and is used to attach and separate the support shafts 62 to and from the shaft support recesses 51.

The shape sustaining wall 52, which is formed between the two shaft support recesses 51 and the attachment-separation port 53 in the widthwise direction, extends along the heightwise direction (direction perpendicular to the wiping surface G) of the wiper blade 12 to integrally connect an upper wall 54 and a lower wall 55 forming the shaft support recesses 51 and the attachment-separation port 53. The shape sustaining wall 52 prevents the upper wall 54 and the lower wall 55 from moving away from each other. That is, the shape sustaining wall 52 functions to couple the upper wall 54 and the lower wall 55 to each other and sustain the shape of the attachment-separation port 53 in the shaft support recesses 51 so that the attachment-separation port 53 does not open.

The arm side coupling portion 31 includes two side walls 61, which face each other in the widthwise direction (direction of pivot axis), and two support shafts 62, which are coaxial and project from the inner surfaces of the side walls 61. The side walls 61 are arranged on the two widthwise sides of the blade side coupling portion 41, and are formed so that the outer surfaces of the side walls 61 are flush with the widthwise side surfaces of the holder member 13. The space between the side walls 61 opens toward the upper side (non-wiping surface side) to allow the blade side coupling portion 41 to be coupled.

In the same manner as the support shaft 43 in the embodiment described above, the support shafts 62 are D-shaped and symmetric to each other. Further, each support shaft 62 includes an arcuate portion 62a, which has a diameter corresponding to the inner diameter of the shaft support recess 51, and a small diameter portion 62b, which has a smaller diameter than the arcuate portion 62a. In the same manner as the embodiment described above, the wiper blade 12 and the wiper arm 11 are relatively pivoted to a position where the small diameter portion 62b of the support shaft 62 corresponds to the attachment-separation port 53 to allow for attachment and separation of the support shafts 62 to and from the shaft support recesses 51 (see FIG. 9). The attachment and separation of the support shaft 62 to and from the shaft support recess 51 are disabled by relatively pivoting the wiper blade 12 about the support shaft 62 from the attachable-separable region, where the attachment-separation port 53 corresponds to the small diameter portion 62b of the support shaft 62, to the wiper usage position shown in FIG. 7, and positioning the wiper blade 12 in the non-attachable-separable region, where the attachment-separation port 53 does not correspond to the small diameter portion 62b.

Such a structure has substantially the same operations and effects (advantages) as the embodiment described above.

Figure 8:
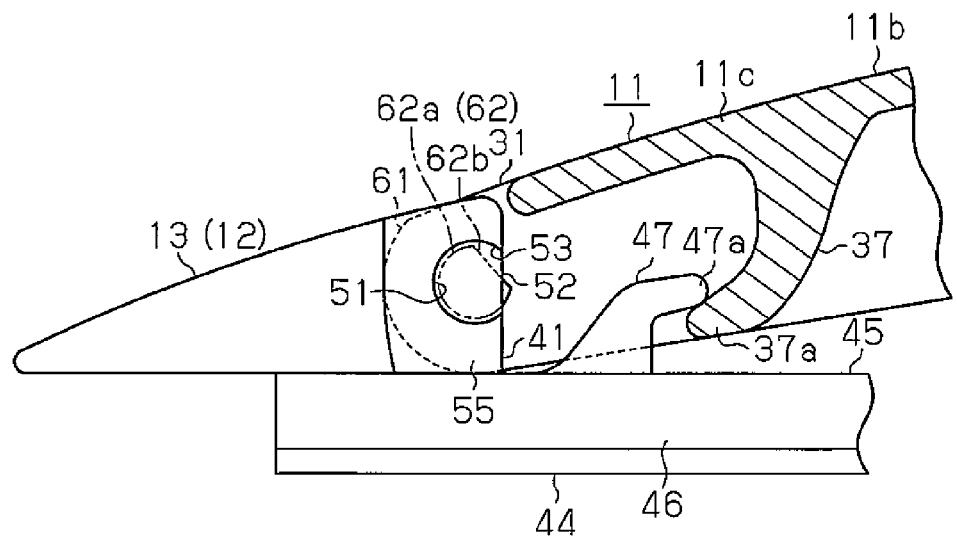
FIG. 8 is a cross-sectional view of the wiper shown in FIG. 6 illustrating the wiper arm and the holder member when an arm side coupling portion and a blade side coupling portion are in engagement.
Figure 9:
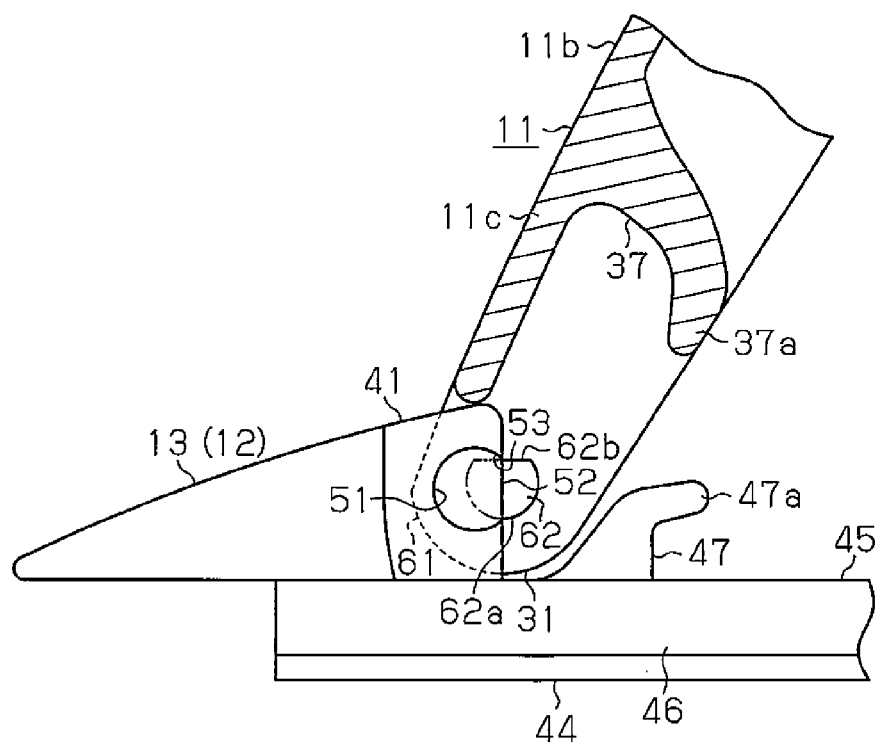
FIG. 9 is a cross-sectional view of the wiper shown in FIG. 6 illustrating attachment and separation of the wiper arm and the holder member.

More specifically, as shown in FIG. 7, at the wiper usage position where the wiper arm 11 and the wiper blade 12 are substantially parallel to each other, the small diameter portions 62b of the support shafts 62 are not in correspondence with the attachment-separation port 53 of the shaft support recesses 51. This disables the attachment and separation of the support shafts 62 and the shaft support recesses 51. Referring to FIG. 8, engagement of the arm side engagement portion 37 and the blade side engagement portion 47 limits pivoting of the wiper blade 12 in the non-attachable-separable region. Referring to FIG. 9, relative pivoting of the wiper blade 12 to the attachable-separable region, where the attachment-separation port 53 corresponds to the small diameter portion 62b of the support shaft 62, disengages the arm side engagement portion 37 from the blade side engagement portion 47, which have been in elastic engagement, and enables attachment and separation of the support shafts 62 and the shaft support recesses 51.

Further, in the same manner as the embodiment described above, in a structure such as that shown in FIGS. 6 and 7, the support shafts 62 and the coupling hole that pivotally couple the wiper blade 12 and the wiper arm 11 are axially divided. Thus, the coupling hole that supports the support shaft 62 does not need to be a through hole. The shape sustaining wall 52 located between the divided coupling holes (two shaft support recesses 51) couple the upper wall 54 and the lower wall 55 to each other so that the attachment-separation port 53 of the shaft support recesses 51 does not open and to sustain the shape of the attachment-separation port 53. Thus, even when the coupling portions 31 and 41 are reduced in size in the heightwise direction (direction perpendicular to the wiping surface G), the attachment-separation port 53 of the shaft support recess 51 does not easily open.

Figure 10:
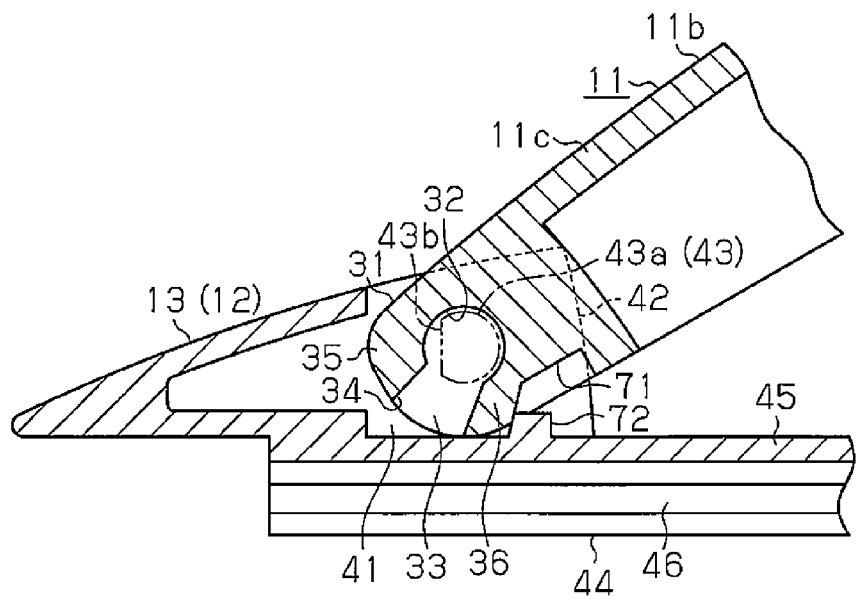
FIG. 10 is a cross-sectional view of a further example of a wiper arm and a holder member.

The structures of the arm side engagement portion 37 and the blade side engagement portion 47 are not limited to the structures of the embodiment described above. For example, as shown in FIG. 10, the arm side engagement portion may be an engagement recess 71 in the lower surface of the arm side coupling portion 31 (lower surface of the lower wall 36), and the blade side engagement portion may be an engagement projection 72 that projects toward the upper side from the upper cover 45 of the rubber holding portion 44 and is engageable with the engagement recess 71.

In the embodiment described above, the shape sustaining wall 33 is formed to completely separate the shaft support recesses 32. Instead, for example, the shaft support recesses 32 may be in partial communication through a through-hole or a slit that extends through the shape sustaining wall 33 in the direction of the pivot axis.

In the embodiment described above, the blade side engagement portion 47 and the arm side engagement portion 37 are arranged toward the basal side of the wiper arm 11 from the support shafts 43 and the shaft support recesses 32, but may be arranged toward the distal side of the wiper arm 11 from the support shafts 43 and the shaft support recesses 32. The blade side engagement portion 47 and the arm side engagement portion 37 may be omitted from the embodiment described above.

In the embodiment described above, the shape sustaining wall 33 is arranged at the middle of the arm side coupling portion 31 in the widthwise direction. Instead, for example, the shape sustaining wall 33 may be formed at a position deviated from the middle in the widthwise direction of the arm side coupling portion 31.

In the embodiment described above, the attachment-separation port 34 of the shaft support recess 32 is formed to open toward the distal side of the wiper arm 11. Instead, for example, the attachment-separation port 34 may be formed to open toward the wiping surface side (lower side) of the wiper arm 11.

The shape of the support shafts 43 is not limited to the shape of the embodiment described above. The small diameter portion 43*b* does not need to be planar as long as the attachable-separable region and the non-attachable-separable region of the wiper blade 12 may be formed.

In the embodiment described above, the rubber holding portion 44 of the holder member 13 surrounds and holds the backing 14 and the head portion 21 of the blade rubber 15. Instead, for example, the rubber holding portion 44 may directly hold only the backing 14 and indirectly hold the blade rubber 15 through the backing 14.

In the embodiment described above, the blade rubber 15 and the arm are coupled with the same holder member 13. Instead, the blade side coupling portion and the rubber holding portion may be arranged in a lever assembly in which levers are coupled in the form of a whippletree.

In the embodiment described above, the present invention is embodied in the vehicle wiper 10 that wipes the surface of the rear window of the vehicle. Instead, for example, the present invention may be embodied in a vehicle wiper that wipes the surface of the windshield of the vehicle.

Figure 11:
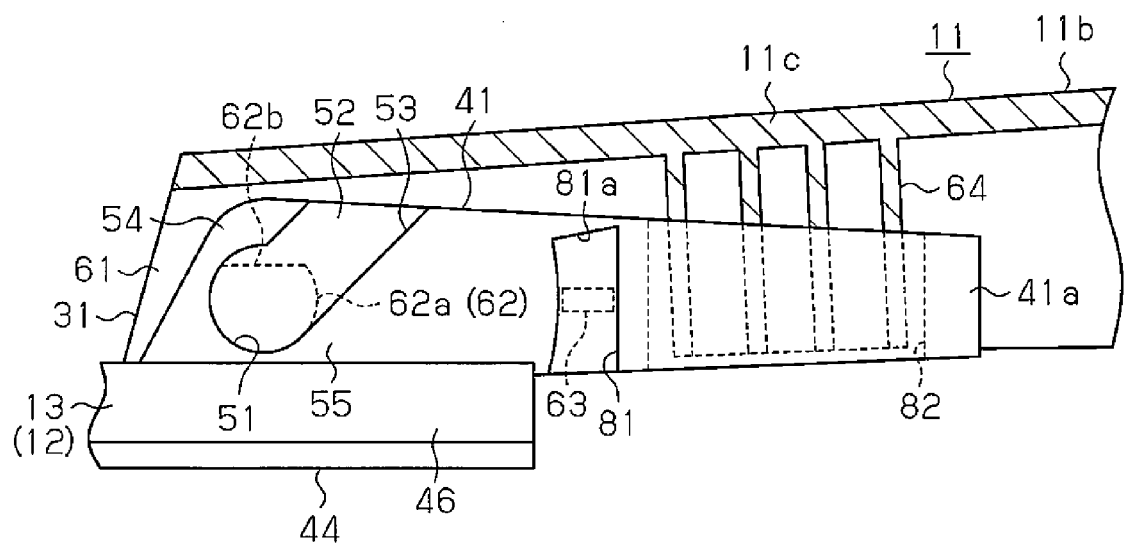
FIG. 11 is a cross-sectional view of another example of a wiper arm and a holder member.
Figure 12:
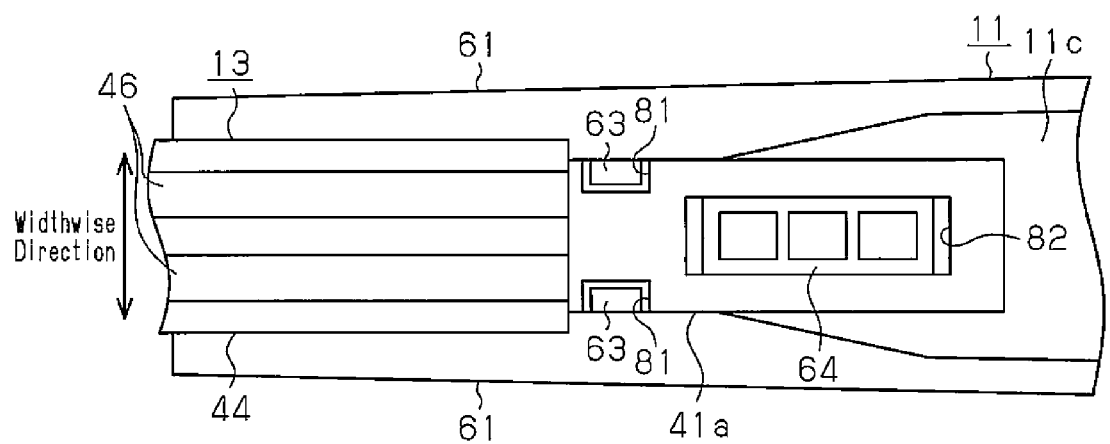
FIG. 12 is a bottom view of the wiper shown in FIG. 11 illustrating a wiper arm and a holder member.

Referring to FIGS. 11 and 12, a lateral vibration suppressing structure that suppresses lateral vibration (vibration in the widthwise direction of the wiper) of the wiper blade 12 may be arranged in the wiper of the embodiment. FIGS. 11 and 12 show an example of a structure (same type of structure as the example of FIGS. 6 and 7) in which the blade side coupling portion 41 includes the shaft support recesses 51. Same reference numerals are given to components that are similar to those in the example shown in FIGS. 6 and 7.

As shown in FIGS. 11 and 12, the blade side coupling portion 41 includes an extending portion 41*a* that extends toward the blade basal side. An engagement groove 81 is formed in the two widthwise side surfaces of the extending portion 41*a*. Each engagement groove 81 opens at the lower surface (end face on the wiping surface side) of the extending portion 41*a*. The attachment-separation port 53 of the shaft support recess 51 extends diagonally upward from the shaft support recess 51 toward the blade basal side and opens in the upper surface (end face on the non-wiping surface side) of the blade side coupling portion 41.

The inner side surface of each side wall 61 of the arm side coupling portion 31 (wiper arm 11) includes an engagement protrusion 63 that projects in the widthwise direction of the wiper. The engagement protrusion 63 is movable in the pivot direction about the shaft support recesses 51 in the engagement groove 81 of the blade side coupling portion 41.

When the wiper blade 12 is located in the non-attachable-separable region where the attachment and separation of the shaft support recesses 51 and the support shafts 62 is disabled, the engagement protrusion 63 engages the upper end 81*a* (end on the non-wiping surface side) of the engagement groove 81 in the pivot direction. The engagement of the engagement protrusion 63 and the upper end 81*a* of the engagement groove 81 limits the pivoting of the wiper blade 12 in the non-attachable-separable region. Disengagement of the engagement protrusion 63 and the upper end 81*a* of the engagement groove 81 and relative pivoting of the wiper blade 12 to the attachable-separable region where the attachment-separation port 53 corresponds to the small diameter portion 62*b* of the support shaft 62 enable the attachment and separation of the support shaft 62 and the shaft support recess 51.

The wiper arm 11 includes a load receiving unit 64 that extends from the upper wall 11*c* toward the wiping surface (lower side in FIG. 11). The load receiving unit 64 is formed at the middle of the wiper arm 11 in the widthwise direction. The load receiving unit 64 is tetragonal in shape and elongated in the longitudinal direction of the wiper as viewed from the rear side (wiping surface side) of the wiper arm 11.

The load receiving unit 64 is inserted into an insertion hole 82, which extends through the extending portion 41*a* of the blade side coupling portion 41. The insertion hole 82 is located toward the basal side of the wiper arm (basal side in the longitudinal direction of the wiper arm 11) from the shaft support recesses 51. The insertion hole 82 is formed to be slightly longer than the load receiving unit 64 in the longitudinal direction of the wiper. Thus, a gap is formed with the insertion hole 82 in the two longitudinal sides of the load receiving unit 64 with the load receiving unit 64 inserted in the insertion hole 82. In the widthwise direction of the wiper, the load receiving unit 64 and the peripheral wall of the insertion hole 82 are in contact with each other or arranged facing each other with an extremely small gap formed in between (gap narrower than the gap in the longitudinal direction of the wiper). The load receiving unit 64 and the insertion hole 82 are formed so as not to inhibit the relative pivoting of the wiper arm 11 and the holder member 13 about the support shafts 62.

In such a structure, when load in the widthwise direction of the wiper is applied to the wiper blade 12 (e.g., when the wiper is driven with the blade rubber 15 frozen onto the wiping surface G), the load is received by the load receiving unit 64 through the blade side coupling portion 41. This limits separation of the support shafts 62 from the shaft support recesses 51 that would occur when the distance is increased in the widthwise direction between the side walls 61 of the wiper arm 11. As a result, separation of the wiper blade 12 from the wiper arm 11 may be limited.

In the example described above, the load receiving unit 64 of the arm side coupling portion 31 is inserted into the insertion hole 82 of the blade side coupling portion 41. However, the recess-projection relationship is not limited in such a manner. For example, the projection of a blade side coupling portion may be inserted into the recess of an arm side coupling portion.

In the example described above, the lateral vibration suppressing structure (the load receiving unit 64 and the insertion hole 82) is arranged on the wiper in which the blade side coupling portion 41 includes the shaft support recess 51. Instead, the lateral vibration suppressing structure may be arranged on the wiper in which the arm side coupling portion 31 includes the shaft support recess like in the embodiment described above.

In the embodiment described above, pivoting of the wiper blade 12 relative to the wiper arm 11 corresponds to relative rotation of the wiper blade 12 and the wiper arm 11. However, relative rotation is not limited in such a manner. More specifically, the wiper arm 11 may rotate relative to the wiper blade 12. In this case, an attachable-separable region and a non-attachable-separable region are set as angular regions of the wiper arm 11 relative to the wiper blade 12. When the wiper arm 11 is pivoted and the wiper arm 11 is in the non-attachable-separable region, the attachment and separation of the support shaft and the shaft support recess are disabled.

The invention claimed is:

1. A vehicle wiper comprising:
a wiper arm;
an arm side coupling portion arranged on a distal end of the wiper arm;
a wiper blade including a blade rubber that wipes a wiping surface, and a holder member that holds a longitudinally central part of the blade rubber, wherein the holder member includes a blade side coupling portion arranged on the wiper blade and pivotally coupled to the arm side coupling portion, and a rubber holding portion that holds the blade rubber, and the rubber holding portion and the blade side coupling portion are integrally formed;
two first side wails arranged on one of the arm side coupling portion and the blade side coupling portion, wherein the two first side walls face each other;
two support shafts that respectively project from inner side surfaces of the two first side walls, wherein the two support shafts are coaxial with each other; and
two shaft support recesses arranged on the other one of the arm side coupling portion and the blade side coupling portion, wherein the two support shafts are pivotally fitted to the two shaft support recesses, respectively, wherein:
each of the support shafts has a small diameter portion located at a predetermined angular position of the wiper arm relative to the wiper blade, and the small diameter portion has as smaller radial dimension than the diameter of the support shaft;
each of the shaft support recesses includes an attachment-separation port, and the attachment-separation port has as dimension that is smaller than the diameter of the support shaft and larger than the radial dimension of the small diameter portion;
an attachable-separable region and a non-attachable-separable region are set as angular regions the wiper blade relative to the wiper arm;
when the wiper blade is in the attachable-separable region, the attachment-separation port and the small diameter portion of the support shaft are in correspondence with each other thereby enabling attachment and separation of the support shafts and the shaft support recesses;
when the wiper blade is pivoted about the support shaft from the attachable-separable region to a wiper usage position and the wiper blade is in the non-attachable-separable region, the attachment-separation port and the small diameter portion are not in correspondence with each other thereby disabling attachment and separation of the support shafts and the shaft support recesses;
the arm side coupling portion or the blade side coupling portion that includes the shaft support recesses includes a shape sustaining portion that sustains the shape of the attachment-separation port, and the shape sustaining portion is located between the two shaft support recesses;
the wiper arm includes an upper wall and second side walls, which extend toward the wiping surface from two widthwise ends of the upper wall, wherein the widthwise ends are ends of the upper wall arranged in a widthwise direction of the wiper;
the upper wall includes a load receiving unit capable of contacting the blade side coupling portion in the widthwise direction of the wiper;
the blade side coupling portion includes an extending portion that extends toward a blade basal side relative to the rubber holding portion; and
the extending portion includes an insertion hole that receives the load receiving unit.

2. The vehicle wiper according to claim 1, wherein the wiper blade and the wiper arm respectively include a blade side engagement portion and an arm side engagement portion that are elastically engaged with each other to limit pivoting of the wiper blade in the non-attachable-separable region.

3. The vehicle wiper according to claim 2, wherein the blade side engagement portion and the arm side engagement portion are arranged toward a basal side of the wiper arm from the support shafts and the shaft support recesses.

* * * * *